United States Patent [19]

Chiodo et al.

[11] Patent Number: 4,620,410

[45] Date of Patent: Nov. 4, 1986

[54] CANNULAR FEEDING APPARATUS

[75] Inventors: Daniel J. Chiodo, Hialeah; Gaylord R. Shirley, Delray Beach; Joseph Oquendo, Hialeah Gardens, all of Fla.

[73] Assignee: Medicore Inc., Miami, Fla.

[21] Appl. No.: 777,448

[22] Filed: Sep. 18, 1985

[51] Int. Cl.[4] .................... B65B 35/30; B65B 55/20
[52] U.S. Cl. ........................ 53/561; 53/122; 53/236; 53/247; 425/126 R
[58] Field of Search ............. 425/126 R; 53/561, 122, 53/236, 247, 248, 444, 260; 604/187

[56] References Cited

U.S. PATENT DOCUMENTS

| | | | |
|---|---|---|---|
| 1,590,080 | 6/1926 | Carter | 425/126 R X |
| 2,879,918 | 3/1959 | Zubal et al. | 53/236 X |
| 2,963,199 | 12/1960 | Petro | 53/236 X |
| 3,135,993 | 6/1964 | Ryan | 425/126 R X |
| 3,964,847 | 6/1976 | Redmer et al. | 425/126 R X |
| 4,342,184 | 8/1982 | Van Eck et al. | 53/561 X |

*Primary Examiner*—James F. Coan

*Attorney, Agent, or Firm*—Oltman and Flynn

[57] ABSTRACT

An apparatus for feeding hypodermic needles into corresponding recesses of a mold cavity in the bottom mold plate of a plastic injection molding machine. The bottom mold plate can be shifted from a molding position to a loading position at one side of the machine. At that side of the machine, a magazine holding two stacks of hypodermic needles is slidably adjustable horizontally with respect to a shuttle plate mounted on that side of the machine. The magazine at the bottom has lower and upper plates slidable respectively across the bottom and top of the shuttle plate. In one position of the magazine, openings in its upper bottom plate register with corresponding openings in the shuttle plate to pass individual needles by gravity into the shuttle plate. In another position of the magazine, openings, in its lower bottom plate register with corresponding openings in the shuttle plate to pass individual needles by gravity from the shuttle plate into corresponding recesses of the mold cavity when the bottom mold plate is in its loading position.

10 Claims, 11 Drawing Figures

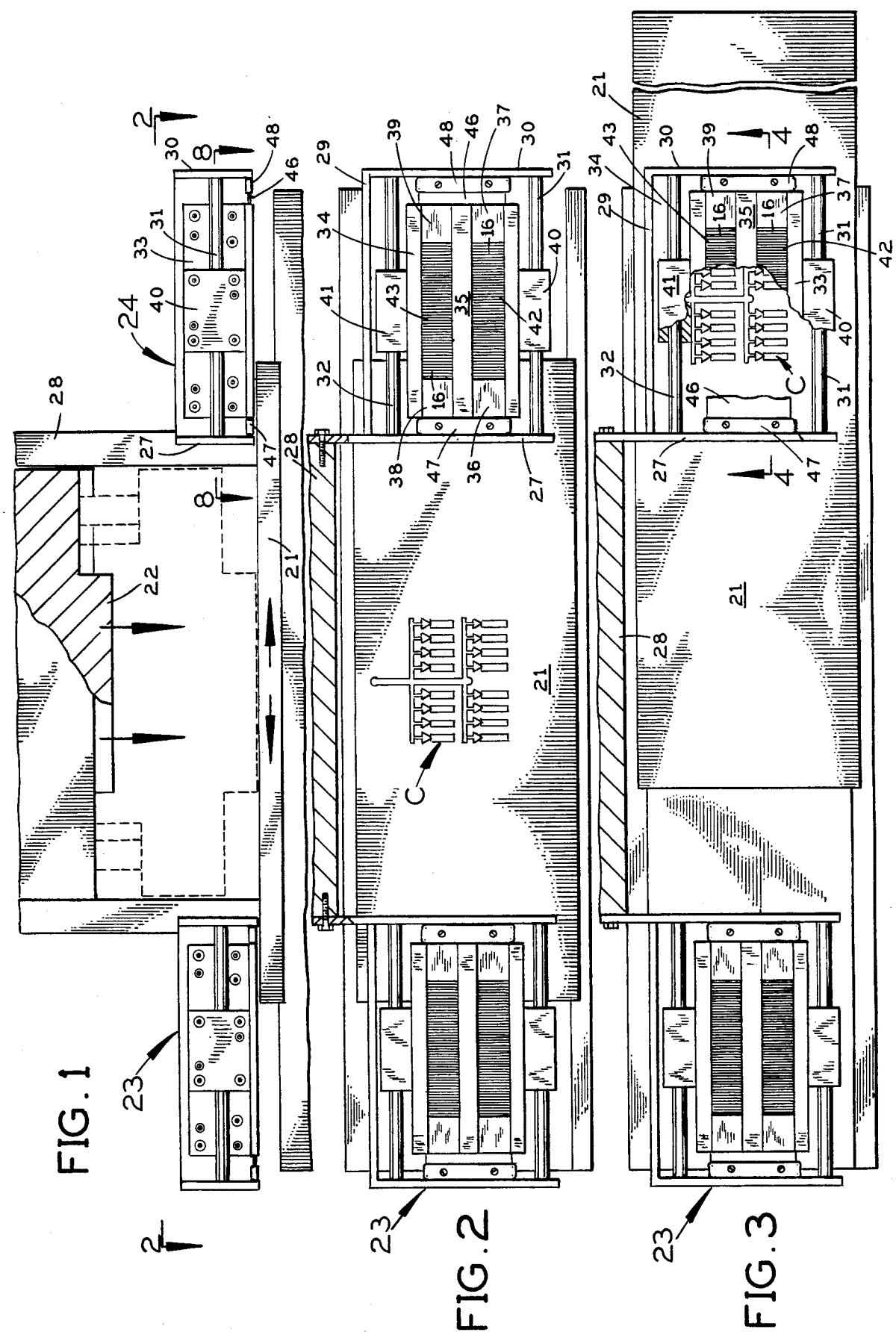

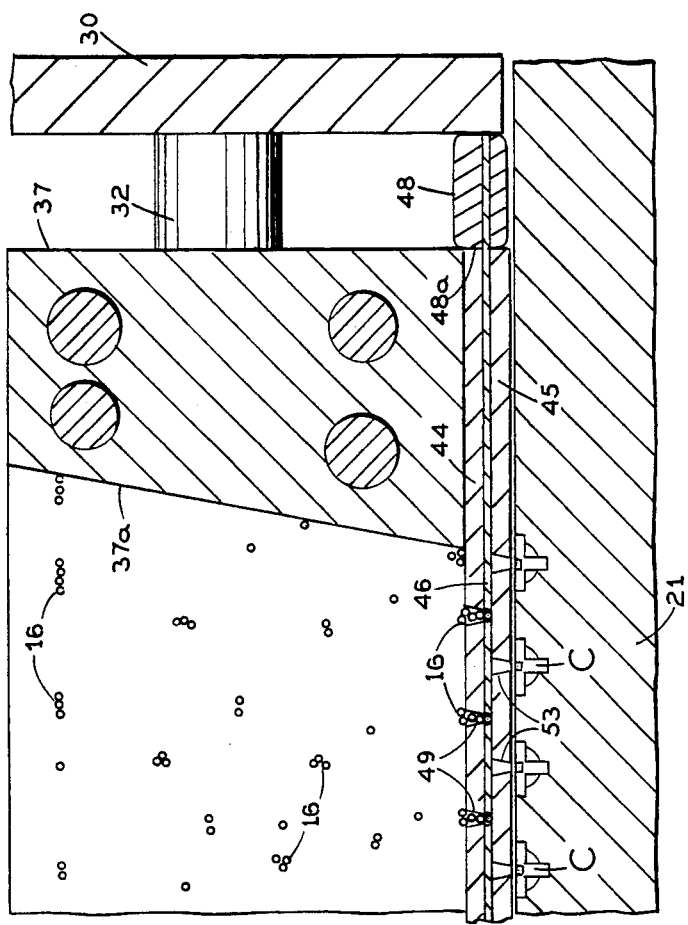
FIG. 4
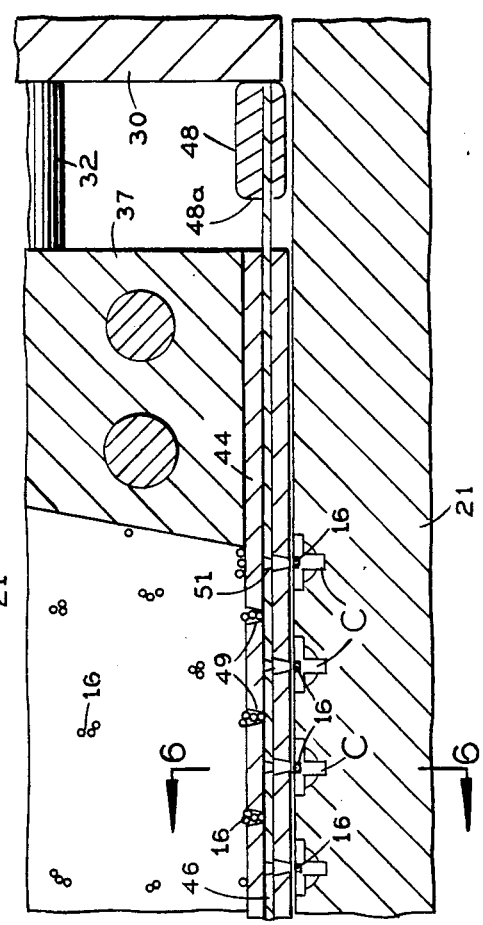
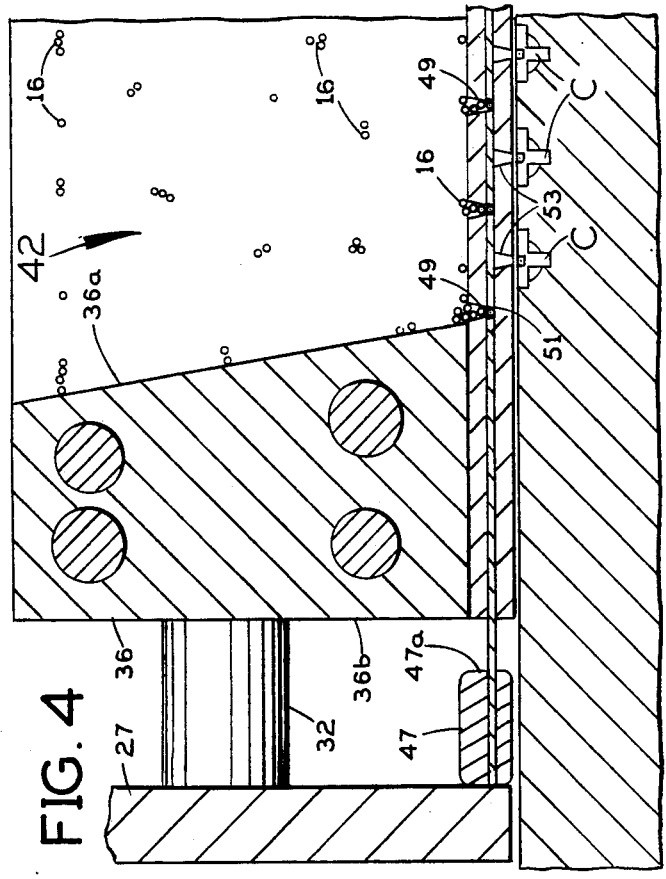
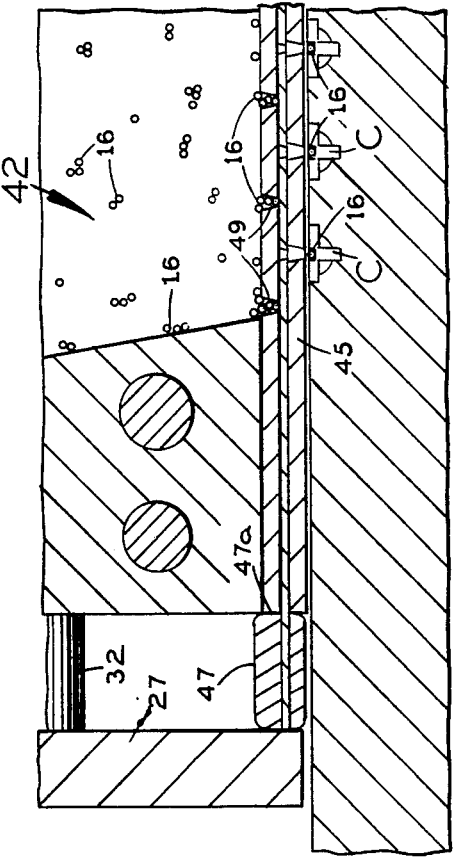
FIG. 5

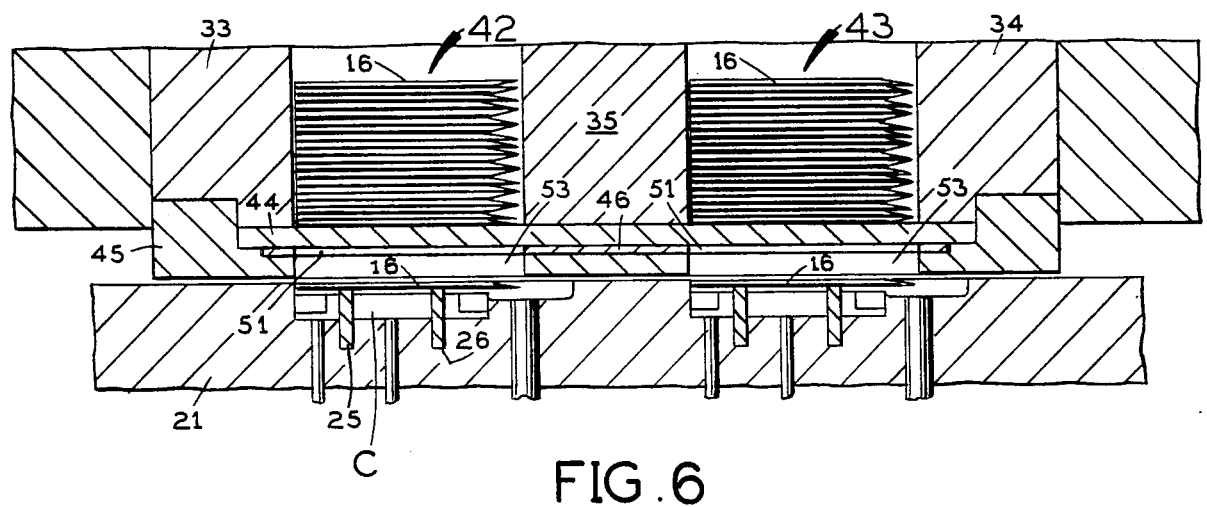
FIG. 6
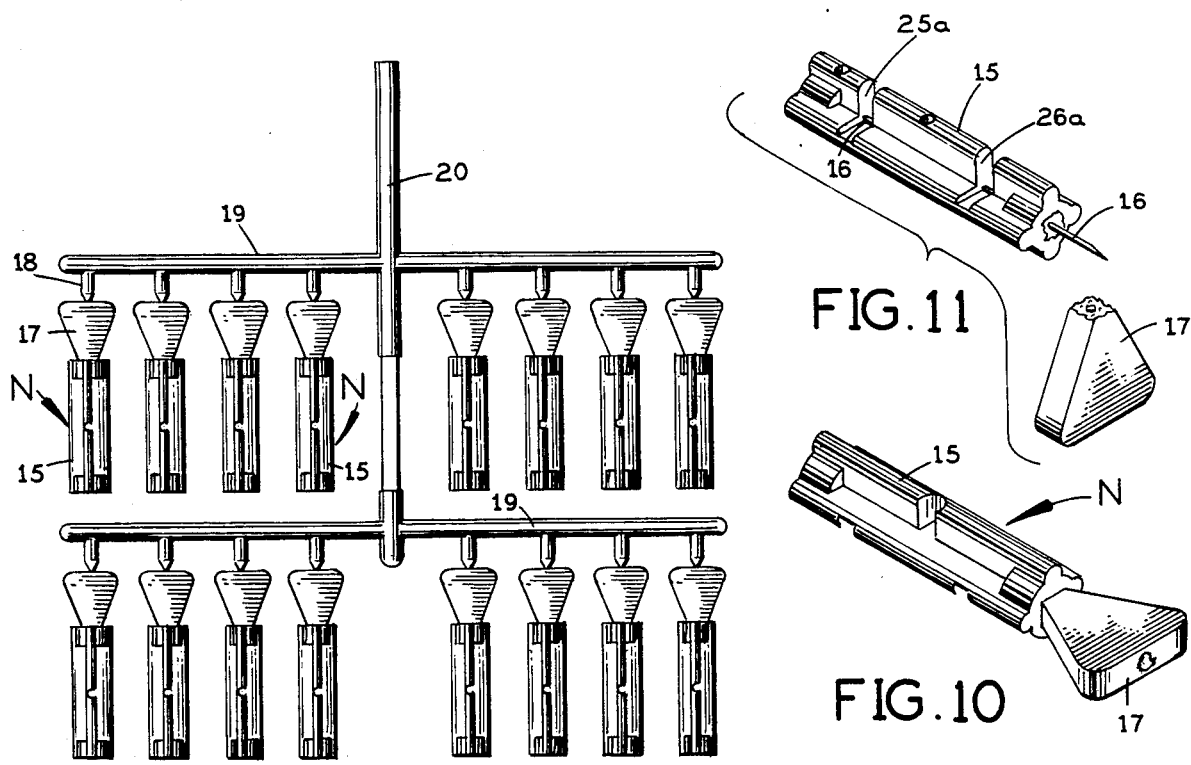
FIG. 11
FIG. 10
FIG. 9

CANNULAR FEEDING APPARATUS

SUMMARY OF THE INVENTION

This invention relates to an apparatus for feeding hypodermic needles into corresponding recesses of the mold cavity of a molding machine in which the needles are to be encased individually in plastic sheaths which will physically protect the needle tips and keep them sterilized until ready for use.

Prior to the present invention, it has been a known practice to drop the needles by gravity from a magazine into corresponding recesses of the mold cavity just before the plastic is introduced to encase the needles. Experience has shown that many such needles become damaged by the gravity feeding operation, acquiring burrs or other surface irregularities on the tip which make the needle unsuitable for use.

The present invention is directed to a novel feeding mechanism for use with a molding machine of this general type to feed the hypodermic needles into corresponding recesses of the mold cavity just before a molding operation but without damaging the needle tips.

A principal object of this invention is to provide such a feeding mechanism which feeds the needles into corresponding recesses of the mold cavity from an overlying magazine in two steps: first, from the magazine down into corresponding openings in a shuttle plate which at that time are blocked from the mold cavity recesses; and afterwards, from the shuttle plate down into the mold cavity recesses after the shuttle plate openings are brought into communication with the mold cavity recesses.

Further objects and advantages of this invention will be apparent from the following detailed description of a presently preferred embodiment, which is illustrated in the accompanying drawings.

DESCRIPTION OF THE DRAWINGS

FIG. 1 is a front elevation of a molding machine equipped with two needle feeding apparatuses in accordance with the present invention;

FIG. 2 is a top plan view of the machine shown in FIG. 1;

FIG. 3 is a view similar to FIG. 2 but with the bottom mold plate of the machine displaced to the right to receive hypodermic needles from the feeding mechanism there and with parts broken away to reveal part of the mold cavity in this mold plate;

FIG. 4 is a fragmentary vertical section taken along the line 4—4 in FIG. 3 longitudinally through the needle feeding mechanism in the loading position of the latter;

FIG. 5 is a view similar to FIG. 4 but showing the needle feeding mechanism in its loaded position;

FIG. 6 is a fragmentary vertical cross-section taken along the line 6—6 in FIG. 5;

FIG. 9 is a top plan view of the molded product produced by the molding machine of FIG. 1 and comprising several hypodermic needles individually encased in plastic;

FIG. 10 is a perspective view of one of the sixteen sheathed hypodermic needle units in the FIG. 9 product; and FIG. 11 is an exploded perspective view of this needle unit after the removal of the plastic head from the tip of the needle.

Figure 7:
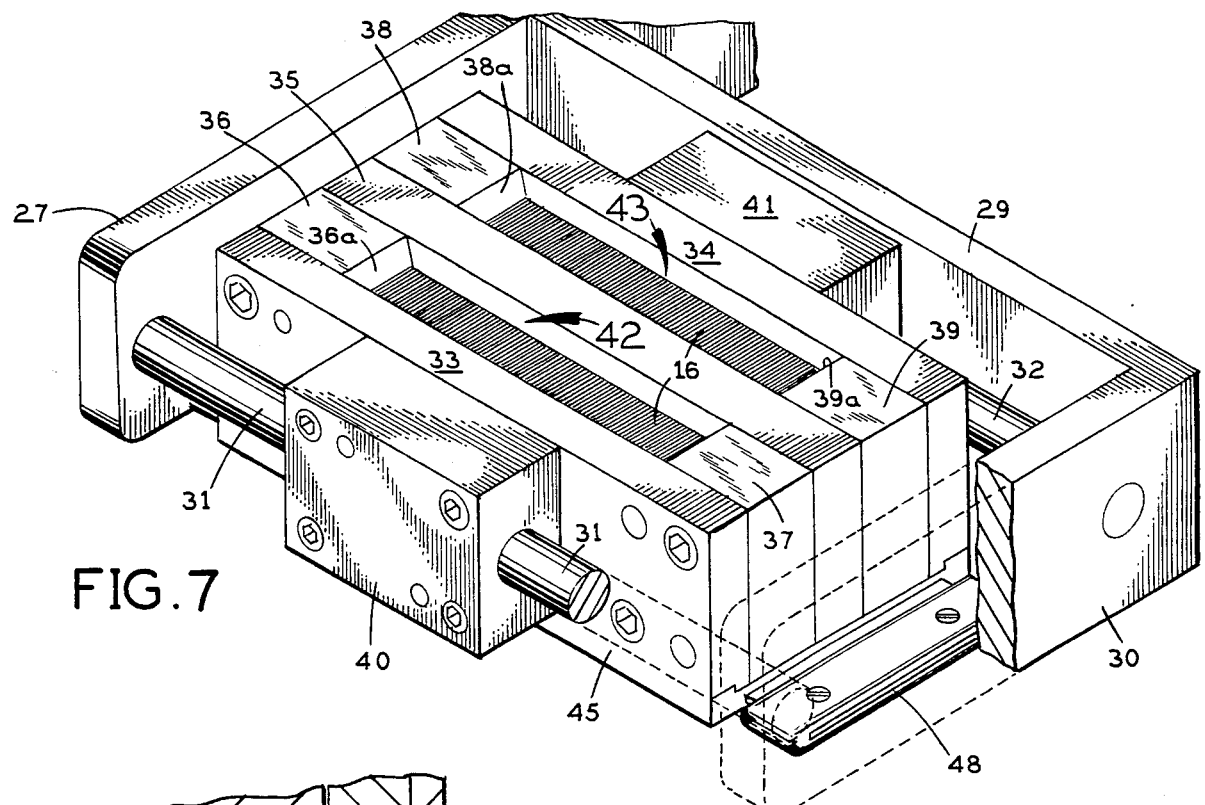
FIG. 7 is a perspective view of the needle feeding mechanism with parts broken away for clarity.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

The machine shown in FIGS. 1-8 is to produce a molded product as shown in plan view in FIG. 9. This product has sixteen identical hypodermic needle units N arranged in two rows of eight each.

Referring to FIGS. 10 and 11, each hypodermic needle unit N has a molded plastic casing 15 of generally cross-shaped cross-section in which a hypodermic needle 16 is embedded, extending lengthwise centrally in the casing. The tip of the needle is encased in a plastic head 17 of generally triangular configuration which is molded integral with the casing 15. The narrowest part of the plastic head 17 is joined to the plastic casing 15 at one end and may be broken away from it by twisting when it is desired to expose the tip of needle 16 for use, as shown in FIG. 11.

As shown in FIG. 9, the wide end of the head 17 of each hypodermic needle unit N is molded integral with a short plastic stem 18 which is of reduced cross-section at its juncture with the head 17 so that it is easy to detach the head and the rest of the hypodermic needle unit from the rest of the integral molded product shown in FIG. 9. The opposite end of each stem 18 is joined to a cross piece 19 which, in turn, is joined to a central longitudinal piece 20.

It is to be understood that the central piece 20, the two cross pieces 19, the sixteen stems 18, the sixteen heads 17 and the sixteen casings 15 are all formed as a single, integral molded body or structure of suitable plastic material.

The present invention is directed to a novel apparatus for feeding the hypodermic needles 16 into corresponding recesses of the mold cavity just before the plastic is introduced to form the individual casings 15 and heads 17 embedding these needles, as well as the connecting stems 18, cross pieces 19 and central piece 20 of the integral product shown in FIG. 9.

Referring to FIG. 1, in broad outline the molding machine which embodies the present invention comprises a mold having a bottom plate 21 with an upwardly-facing mold cavity open at the top of this plate and a vertically reciprocable platen 22 which can move down to close the mold cavity when the product of FIG. 9 is to be molded, a needle feed mechanism 23 according to the present invention on the left side of the platen 22, and a similar needle feed mechanism 24 on the right side. The bottom plate 21 of the mold is moved cyclically from beneath the platen 22 to the left beneath the needle feed mechanism 23 and to the right beneath the needle feed mechanism 24, in either case to receive the hypodermic needles from the feed mechanism just before the next molding operation takes place, at which time the bottom mold plate 21 will be back beneath the reciprocable platen 22.

As shown in FIG. 2, the laterally shiftable bottom plate 21 of the mold has a generally flat top face with a recess or cavity C whose shape corresponds to that of the molded product shown in enlarged detail in FIG. 9. The mold cavity presents sixteen recesses for receiving the sixteen hypodermic needles individually.

FIG. 5 shows the bottom mold plate 21 shifted to the right beneath the needle feeding mechanism 24 on that side, with a needle 16 having been inserted in each corresponding recess of the mold cavity C. As shown in FIG. 6, at this time each needle 16 rests on two inserts 25 and 26 projecting up from the bottom of the mold cavity C so that plastic introduced into the mold cavity through injection passageways will completely surround the needle except at these inserts. As shown in FIG. 11, the molded plastic casing 15 has grooves 25a and 26a where the needle 16 is exposed. These grooves are formed where the inserts 25 and 26 in the corresponding recess of the mold cavity engaged the needle.

Figure 8:
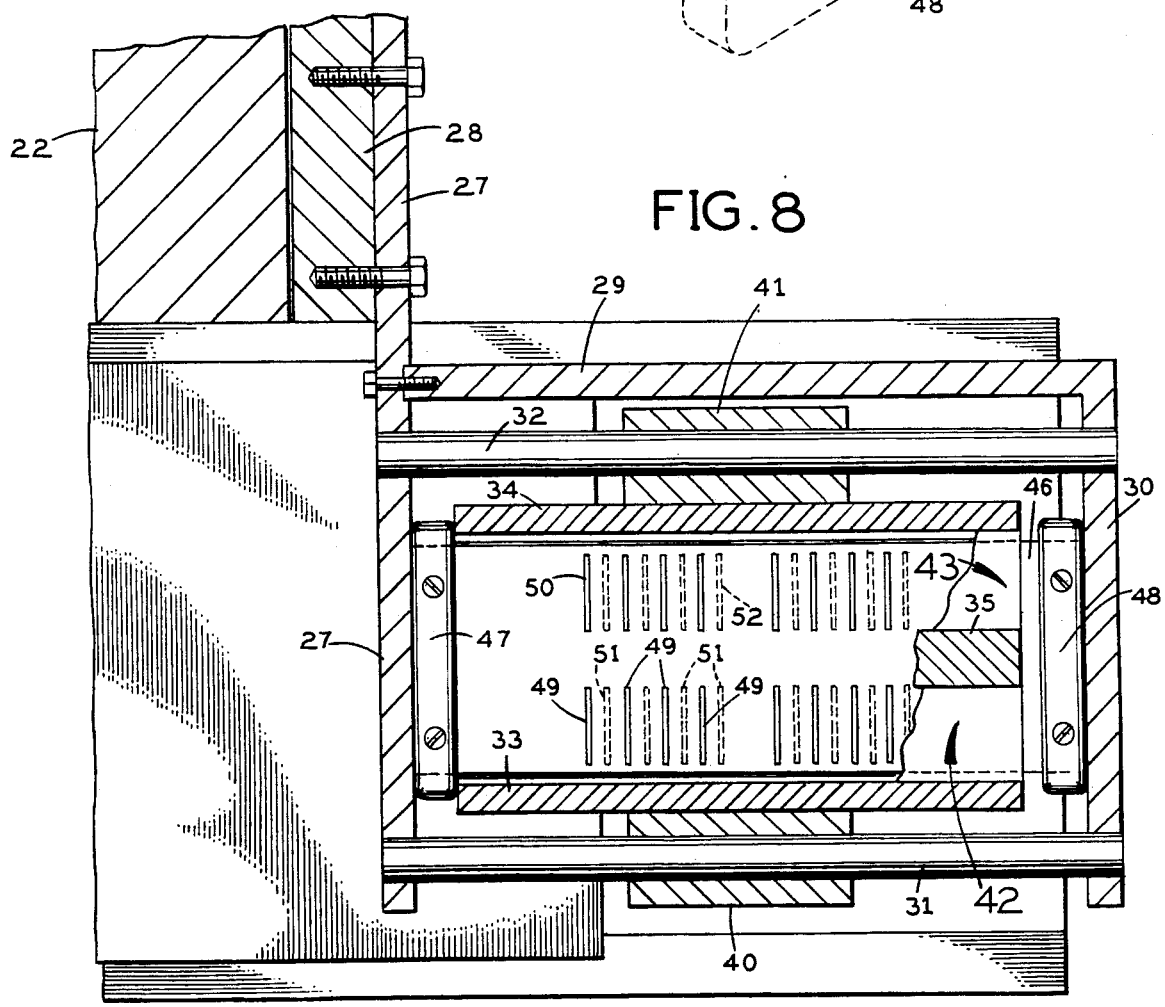
FIG. 8 is a horizontal longitudinal section through the needle feeding mechanism taken along the line 8—8 in FIG. 1.

Referring to FIGS. 7 and 8, the needle feeding mechanism 24 on the right side of the machine comprises a rigid frame having a generally flat, rectangular inner piece 27 bolted to the housing 28 of the molding machine, a flat rectangular back piece 29 bolted to the inner piece 27 and extending perpendicularly from it to the right (i.e., away from the platen 22), and a flat rectangular outer piece 30 joined integrally to the back piece 29 at its outer end and extending forward from the back piece parallel to the inner piece 27. The inner piece 27, back piece 29 and outer piece 30 form a three-sided, rigid frame which is open at the front. Near the open front of this frame a front guide rod 31 extends horizontally between the inner and outer pieces 27 and 30 of the frame. A similar horizontal rear guide rod 32 extends between the frame pieces 27 and 30 a short distance in front of the back piece 29 of the frame. The guide rods 31 and 32 extend parallel to each other at the same level.

A magazine for holding needles 16 is mounted in the frame 27, 29, 30 and 32. This magazine is slidable back and forth between the frame pieces 27 and 30 through ¼ inch strokes. The magazine has rectangular front and back plates 33 and 34, both extending parallel to the back piece 29 of the frame. The magazine also has a flat, rectangular divider plate 35 extending parallel to its front and back plates 33 and 34 and located midway between them, spacers 36 and 37 engaged between its front plate 33 and divider plate 35 at their opposite ends, and spacers 38 and 39 engaged between divider plate 35 and its rear plate 34 at their opposite ends. These parts of the magazine are held rigidly assembled by bolts and nuts.

A front guide block 40 is bolted to the front plate 33 of the magazine and is slidably mounted on the front guide rod 31 of the frame. Similarly, a rear guide block 41 on the back of the magazine is slidably mounted on the rear guide rod 32 of the frame.

As shown in FIG. 4, the spacers 36 and 37 at opposite ends of the magazine toward the front have oppositely inclined faces 36a and 37a, respectively, on the inside, which taper slightly toward each other downward along these faces. The front plate 33 of the magazine has a flat, vertical, rear face. The divider plate 35 has a flat, vertical front face. These faces of the magazine define a front hopper 42 which is of uniform depth from front to back and is of progressively decreasing side-to-side width from top to bottom. Needles 16 are piled in this front hopper extending longitudinally horizontally from the front plate 33 to the divider plate 35.

The magazine has a similar rear hopper 43 behind the divider plate 35. At the ends of this hopper the spacers 38 and 39 present respective downwardly and inwardly inclined flat inside faces 38a and 39a (FIG. 2). This rear hopper holds a large number of needles 16, each positioned horizontally and extending lengthwise from the back face of divider plate 35 to the inside front face of rear plate 34.

The magazine has an upper bottom plate 44 (FIGS. 4 and 5) and a lower bottom plate 45, both attached to the front and rear plates 33 and 34 at the bottom. There is a small vertical clearance between plates 44 and 45. A flat rectangular shuttle plate 46 is received in this clearance and it slidably engages the upper bottom plate 44 from below and the lower bottom plate 45 from above. The shuttle plate 46 extends beyond plates 44 and 45 at both ends of the magazine. An end piece assembly 47 is bolted to the shuttle plate 46 at one end, and a similar end piece assembly 48 is bolted to the shuttle plate at its opposite end. These end piece assemblies snugly engage the inside faces of frame pieces 27 and 30, so that the shuttle plate is substantially fixidly positioned inside the frame. The width of the magazine from side to side is ¼ inch shorter than the distance between the respective inside faces 47a and 48a of the end piece assemblies 47 and 48 on the shuttle plate.

At the bottom of the front hopper 42 the upper bottom wall 44 of the magazine presents eight openings 49 (FIG. 8) spaced apart from left to right and each elongated from front to back. Each opening 49 is slightly longer than a single needle 16. As shown in FIGS. 4 and 5, along its entire length from front to back on the magazine each opening 49 is of tapered cross-section, being widest at the top and narrowest at the bottom. The width at the top is slightly less than the thickness of two needles 16 and at the bottom is slightly more than the thickness of a single needle. The needles pass down by gravity one at a time through the openings 49.

As shown in FIG. 8, the upper bottom wall 44 of the magazine presents a similar second series of openings 50 at the bottom of the rear hopper 43.

The shuttle plate 46 presents eight elongated openings 51, shown in phantom in FIG. 8, which are adapted to be aligned individually with the openings 49 in the upper bottom wall 44 at the bottom of the front hopper 42. Also, the shuttle plate has a second series of eight elongated openings, shown in phantom at 52 in FIG. 8, which are aligned individually with the openings 50 in the upper bottom wall 44 at the bottom of the rear hopper 43 when the openings 51 and 49 are aligned. FIG. 4 shows the shuttle plate openings 51 registering with the upper bottom wall openings 49. The width of each shuttle plate opening 51 or 52 is just slightly greater than the width of a single needle 16, so that when the openings 51 and 49 are aligned and the openings 52 and 50 are aligned a single needle 16 drops down into each shuttle plate opening 51 or 52.

The lower bottom plate 45 on the magazine presents a series of eight elongated openings 53 at the bottom of the front hopper 42, and a second series of eight similar openings at the bottom of the rear hopper 43. Each of these openings in the lower bottom plate 45 is wider at the top than at the bottom. Each opening in the bottom plate 45 directly overlies and registers with a corresponding recess of the mold cavity C in the bottom mold plate 21 when the latter is beneath the right-hand magazine 24. Each of the lower bottom plate openings 53 is offset laterally (from left to right in FIG. 4) ¼ inch from the corresponding opening 49 in the upper bottom plate 44.

With this arrangement each needle 16 passes down through an opening 49 or 50 in the upper bottom plate 51 into a corresponding opening 51 or 52 in shuttle plate 46 when the shuttle plate openings register with the openings in the upper bottom plate 44, as shown in FIG. 4 In this position of the parts, the shuttle plate openings are offset laterally from, and out of registration with, the openings 53 in the lower bottom plate 45 on the magazine. Later, when the shuttle plate openings register with the openings 53 in the lower bottom plate 45, each needle passes from the shuttle plate opening down through the registering opening 53 in the lower bottom plate 45 and into the corresponding recess of the mold cavity C in the bottom plate 21 of the mold, as shown in FIG. 5.

Before the lower mold plate 21 moves over beneath the needle feeding mechanism 24 on the right (i.e., in the position shown in FIG. 1), the magazine and the shuttle plate 46 are positioned with respect to each other as shown in FIGS. 5 and 8, that is, with the shuttle plate openings 51 and 52 out of registration with the openings 49 and 50 in the upper bottom plate 44 on the magazine, and with the shuttle plate openings in registration with the openings 53 in the lower bottom plate 45.

When the mold plate 21 moves to the right to a position beneath the needle feeding mechanism 24, the magazine is displaced ¼ inch to the right, to the position shown in FIG. 4, so that a single needle drops from each opening 49 or 50 in the upper bottom plate 44 on the magazine into the corresponding shuttle plate opening 51 or 52, which now registers with it.

Then, when the mold plate 21 starts to move back to the left toward the molding position beneath the vertically reciprocable platen 22, the magazine is displaced back to the left to the position shown in FIG. 5, bringing each opening 53 in its lower bottom plate 45 into registration with a corresponding shuttle plate opening. Consequently, a single needle drops from each shuttle plate opening down through the corresponding opening 53 in the lower bottom plate 45 and into the recess of the mold cavity C which is directly below.

Preferably, the person operating the molding machine positions the magazine by grasping it manually and sliding it along the guide rods 31 and 32 between the just-described positions with respect to the mold plate 21 after the mold plate has moved beneath that magazine. The machine operator may do this conveniently by grasping the guide block 40 on the front of the magazine.

Except for the needle feeding apparatus in accordance with the present invention, located on each side, the molding machine itself may be a plastic injection molding machine known as "Newbury Eldorado Model V4-30ARS," sold by Newbury Industries, Inc., Newbury, Ohio 44065.

The needle feeding apparatus 23 at the left side of the molding machine in FIG. 1 is a mirror image of the feeding apparatus 24 on the right side and need not be described in detail. Preferably, the bottom mold plate 21 is shifted alternately to the left and right, so that every other needle feeding operation takes place successively from the left and right feeding apparatuses 23 and 24, respectively.

We claim:

1. For use with a plastic molding machine having:
a bottom mold plate with a plurality of horizontally elongated mold cavity recesses open at the top, each shaped and dimensioned to receive an individual horizontally disposed hypodermic needle;
and a platen above said bottom mold plate for closing said mold cavity recesses with the hypodermic needles therein;
said bottom mold plate being horizontally movable laterally from beneath said platen to a loading position for receiving hypodermic needles in said mold cavity recesses;
an apparatus for feeding hypodermic needles by gravity into said mold cavity recesses when said bottom mold plate is offset laterally from beneath said platen to said loading position, said apparatus comprising:
a magazine having a hopper for holding a plurality of horizontally disposed hypodermic needles stacked on top of one another and having
(1) an upper bottom plate at the bottom of said hopper having a plurality of horizontally disposed openings, each shaped and dimensioned to pass an individual horizontally disposed hypodermic needle downward, and
(2) a lower bottom plate spaced below said upper bottom plate and having a plurality of horizontally elongated openings, each shaped and dimensioned to pass an individual horizontally disposed hypodermic needle downward, each of said openings in the lower bottom plate being offset in one direction horizontally a predetermined distance from a corresponding opening in the upper bottom plate;
and a shuttle plate located between said upper and lower bottom plates of the magazine;
said magazine and said shuttle plate being relatively adjustable horizontally in said one direction;
said shuttle plate having a plurality of horizontally elongated openings, each shaped and dimensioned to pass an individual horizontally disposed hypodermic needle downward and each positioned
(1) to register with a corresponding opening in the upper bottom plate of the magazine in one position of the magazine relative to the shuttle plate, and
(2) to register with a corresponding opening in the lower bottom plate of the magazine in another position of the magazine relative to the shuttle plate.

2. An apparatus according to claim 1 wherein
said shuttle plate is snugly engaged between and slidably engaged by said upper and lower bottom plates of the magazine;
and further comprising: p1 means slidably supporting said magazine for adjustment horizontally in said one direction toward and away from said platen of the molding machine.

3. An apparatus according to claim 2 wherein:
said shuttle plate extends horizontally beyond said upper and lower bottom plates at each end of the magazine in said one direction;
and further comprising:
a respective end piece assembly on said shuttle plate beyond each end of the magazine in said one direction, said end piece assemblies being spaced apart in said one direction more than the length of said upper and lower bottom plates of the magazine in said one direction and providing limit stops for engagement respectively by the magazine to limit the displacement of the magazine with respect to the shuttle plate.

4. An apparatus according to claim 2 and further comprising:
frame means for rigidly mounting said shuttle plate on said molding machine at one side of said platen therein;
and rigid guide members on said frame slidably supporting said magazine for slidable adjustment horizontally in said one direction toward and away from said platen.

5. An apparatus according to claim 4 wherein:
said shuttle plate extends horizontally beyond said upper and lower bottom plates at each end of the magazine in said one direction;
and further comprising:
a respective end piece assembly on said shuttle plate beyond each end of the magazine in said one direction, said end piece assemblies being spaced apart in said one direction more than the length of said upper and lower bottom plates of the magazine in said one direction and providing limit stops for engagement respectively by the magazine to limit the displacement of the magazine with respect to the shuttle plate.

6. In combination with a plastic molding machine having:
a bottom mold plate with a plurality of horizontally elongated mold cavity recesses open at the top, each shaped and dimensioned to receive an individual horizontally disposed hypodermic needle;
and a platen above said bottom mold plate for closing said mold cavity recesses with the hypodermic needles therein;
said bottom mold plate being horizontally movable laterally from beneath said platen to a loading position for receiving hypodermic needles in said mold cavity recesses;
an apparatus for feeding hypodermic needles by gravity into said mold cavity recesses when said bottom mold plate is offset laterally from beneath said platen to said loading position, said apparatus comprising:
a magazine having a hopper for holding a plurality of horizontally disposed hypodermic needles stacked on top of one another and having
(1) an upper bottom plate at the bottom of said hopper having a plurality of horizontally elongated openings, each shaped and dimensioned to pass an individual horizontally disposed hypodermic needle downward,
and (2) a lower bottom plate spaced below said upper bottom plate and having a plurality of horizontally elongated openings, each shaped and dimensioned to pass an individual horizontally disposed hypodermic needle downward, each of said openings in the lower bottom plate being offset in one direction horizontally a predetermined distance from a corresponding opening in the upper bottom plate;
and a shuttle plate located between said upper and lower bottom plates of the magazine;
said magazine and said shuttle plate being located on one side of said platen above said loading position of the bottom mold plate and being relatively adjustable horizontally in said one direction;
said shuttle plate having a plurality of horizontally elongated openings, each shaped and dimensioned to pass an individual horizontally disposed hypodermic needle downward and each positioned
(1) to register with a corresponding opening in the upper bottom plate of the magazine in one position of the magazine relative to the shuttle plate,
and (2) to register with a corresponding opening in the lower bottom plate of the magazine in another position of the magazine relative to the shuttle plate.

7. The combination of claim 6 wherein:
said shuttle plate is snugly engaged between and slidably engaged by said upper and lower bottom plates of the magazine;
and further comprising:
means slidably supporting said magazine for adjustment horizontally in said one direction toward and away from said platen of the molding machine.

8. The combination of claim 7 wherein:
said shuttle plate extends horizontally beyond said upper and lower bottom plates at each end of the magazine in said one direction;
and further comprising:
a respective end piece assembly on said shuttle plate beyond each end of the magazine in said one direction, said end piece assemblies being spaced apart in said one direction more than the length of said upper and lower bottom plates of the magazine in said one direction and providing limit stops for engagement respectively by the magazine to limit the displacement of the magazine with respect to the shuttle plate.

9. The combination of claim 7 and further comprising:
frame means rigidly mounting said shuttle plate on said molding machine at said one side of said platen therein;
and rigid guide members on said frame slidably supporting said magazine for slidable adjustment horizontally in said one direction toward and away from said platen.

10. The combination of claim 9 wherein:
said shuttle plate extends horizontally beyond said upper and lower bottom plates at each end of the magazine in said one direction;
and further comprising:
a respective end piece assembly on said shuttle plate beyond each end of the magazine in said one direction, said end piece assemblies being spaced apart in said one direction more than the length of said upper and lower bottom plates of the magazine in said one direction and providing limit stops for engagement respectively by the magazine to limit the displacement of the magazine with respect to the shuttle plate.

* * * * *